UNITED STATES PATENT OFFICE.

CHRISTIAN L. BOEFER AND CHARLES C. KRUSE, OF KANSAS CITY, MISSOURI.

PROCESS OF MAKING WEISS-BEER EXTRACT.

SPECIFICATION forming part of Letters Patent No. 410,872, dated September 10, 1889.

Application filed November 24, 1888. Serial No. 291,781. (Specimens.)

*To all whom it may concern:*

Be it known that we, CHRISTIAN L. BOEFER and CHARLES C. KRUSE, of Kansas City, in the county of Jackson and State of Missouri, have invented a certain new and useful Improved Process of Making Weiss-Beer Extract, of which the following is a full, clear, and exact description.

The invention consists in a process, hereinafter described, by which a superior quality of weiss-beer extract is made.

On a basis of one hundred pounds we grind up separately thirty-three pounds of barley-malt and sixty-seven pounds of wheat-malt. After the malt is ground the barley-malt and wheat-malt are thoroughly mixed together and soaked in about twenty gallons of water for about thirty minutes. On a basis of one hundred pounds of malt there will be about sixty-seven pounds of wheat-malt and thirty-three pounds of barley-malt. They are ground separately and then intimately mixed. To the mixture is added about twenty gallons of water at a heat, say, of 40° Reaumur, and the mixture allowed to soak for half an hour. Then about thirteen gallons of water are added and the whole raised to a temperature of 70° Reaumur and kept at that temperature for about twenty minutes. The liquid, with the soluble parts in solution, is removed by straining. The solution is then kept at a temperature of about 70° Reaumur until the saccharine matter has been produced from the amylaceous matter of the solution. We then take three pounds of hops and boil them in about two gallons of water for half an hour, then strain off the decoction and mix it with the wort. The water is then driven off by boiling, and the residue is the malt extract.

We are well aware that wheat-malt and barley-malt mixed together have before been employed in the manufacture of beer, and we are also aware that it is not new to employ an extract of malt and hops for the production of the same substance; but our invention does not consist in the employment of these ingredients; nor do we wish to claim the use of the same *per se*. We have discovered by a long course of experiments that to secure good results in the manufacture of the weiss-beer extract from the ingredients hereinbefore named, it is absolutely necessary, so far as we have been able to determine, to employ the successive steps of the process, the degrees of heat, and the proportions of such substances hereinbefore named. It is found that if the heat is not raised to the proper degree the extract will spoil, while, on the other hand, if too great a degree of heat is employed certain germs would be killed, and thus the extract would be rendered useless, as it would not be capable of fermenting when it was desired to make the beer. Therefore, the proportions of ingredients, the degrees of heat, and the particular steps are to be deemed a material and essential part of our invention; and hence What we consider new, and desire to secure by Letters Patent, is—

1. The described process of producing weiss-beer extract—namely, by mixing wheat and barley malt in about the proportions of two parts of wheat-malt to one part of barley-malt, subjecting them to mashing, in the manner stated, then extracting the wort from the mash, then mixing the wort with a decoction of hops, and boiling the whole for the evaporation of the water.

2. The process of manufacturing weiss-beer extract, which consists in intimately mixing ground wheat-malt and barley-malt in the proportion of about sixty-seven to thirty-three, respectively, adding water at a temperature of about 40° Reaumur, and allowing the mixture to soak, adding a further quantity of water and maintaining the temperature at about 70° Reaumur until the saccharine matter has been produced from the amylaceous matter, adding a decoction of hops, and subsequently evaporating until the desired consistency is reached, as set forth.

CHRISTIAN L. BOEFER.
CHARLES C. KRUSE.

In presence of—
JAS. E. KNIGHT,
F. W. ROTZEL.